INVENTORS
Benedict E. Meulemans
Warren A. Nelson
BY R. G. Story
ATTORNEY

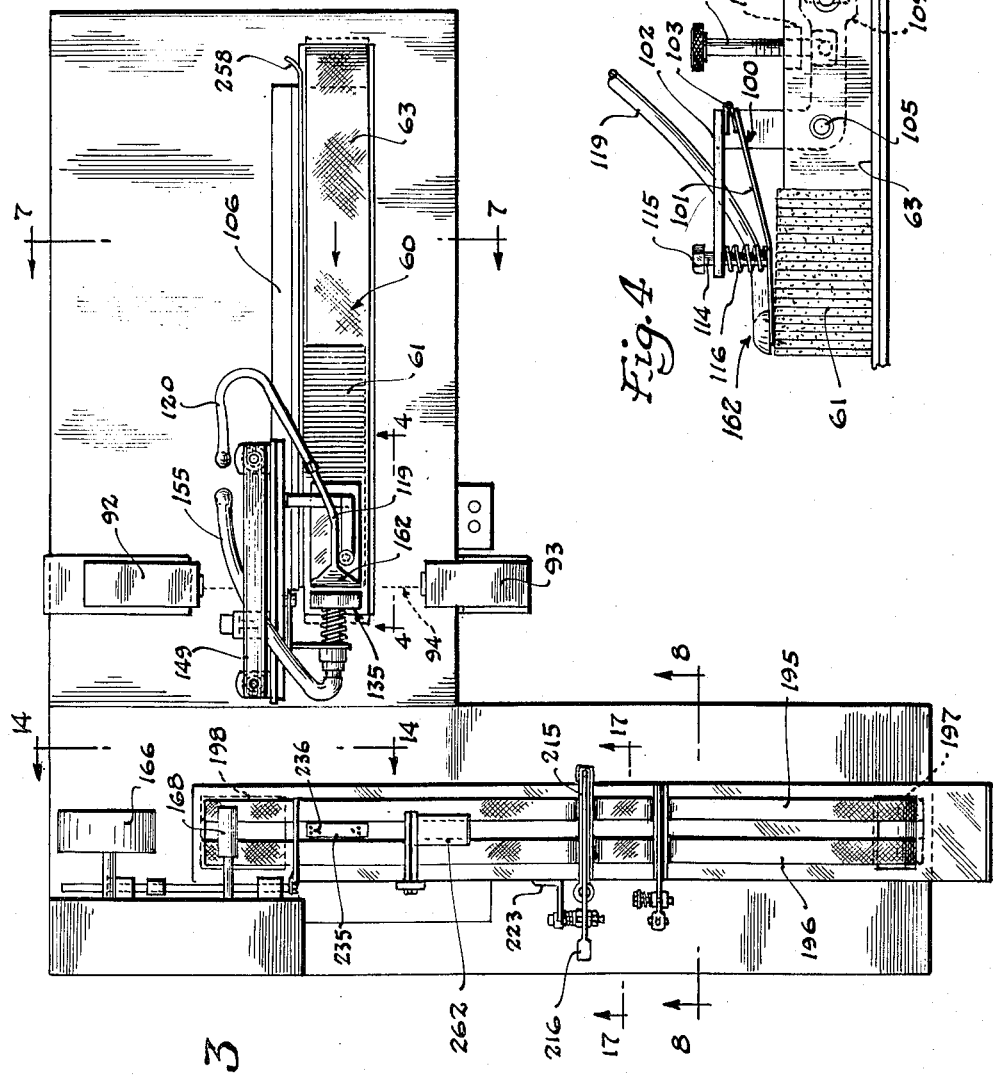

Jan. 26, 1954   B. E. MEULEMANS ET AL   2,667,420
METHOD AND APPARATUS FOR HANDLING SLICED FOOD
Filed Aug. 8, 1950   9 Sheets-Sheet 3
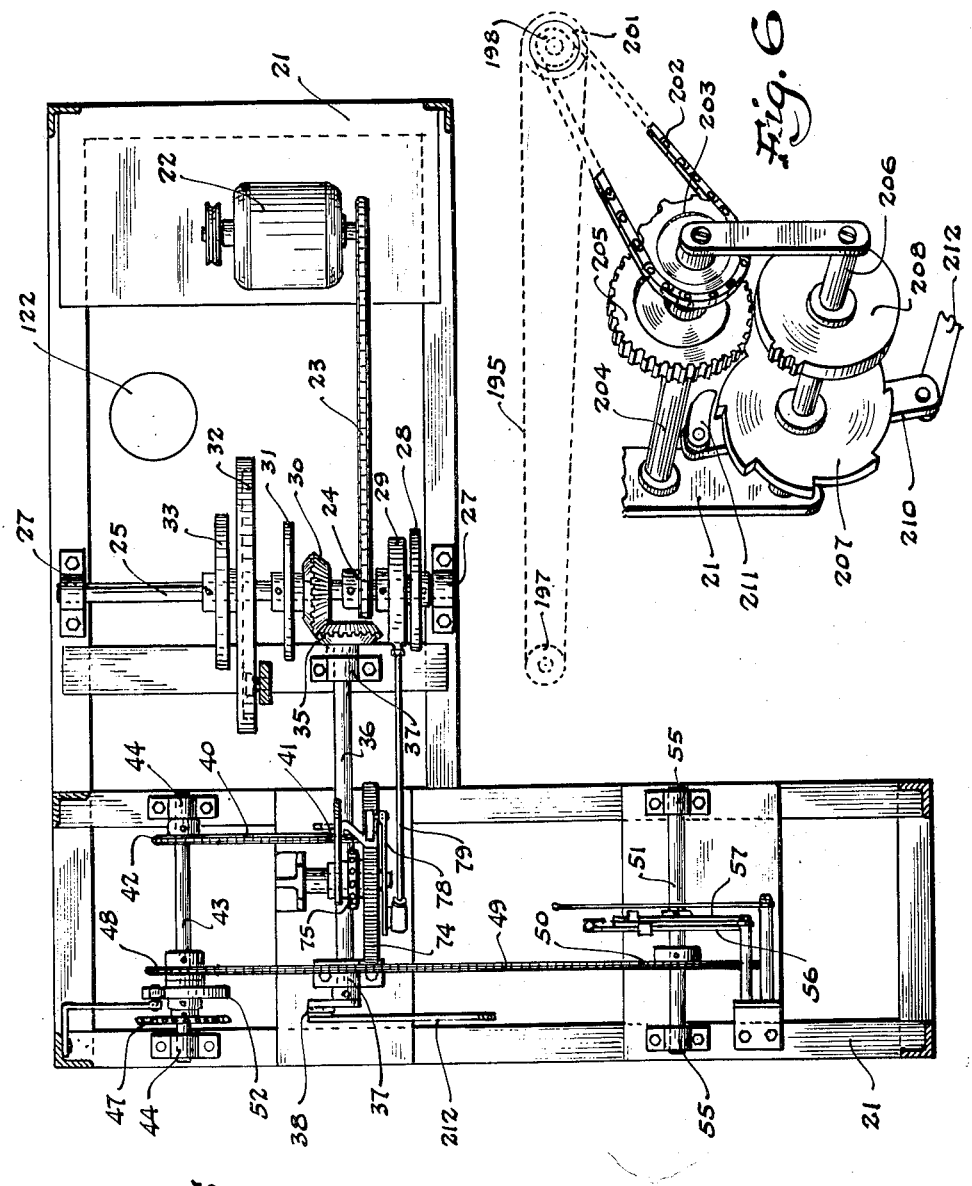
INVENTORS
Benedict E. Meulemans
Warren A. Nelson
BY R. D. Story
ATTORNEY

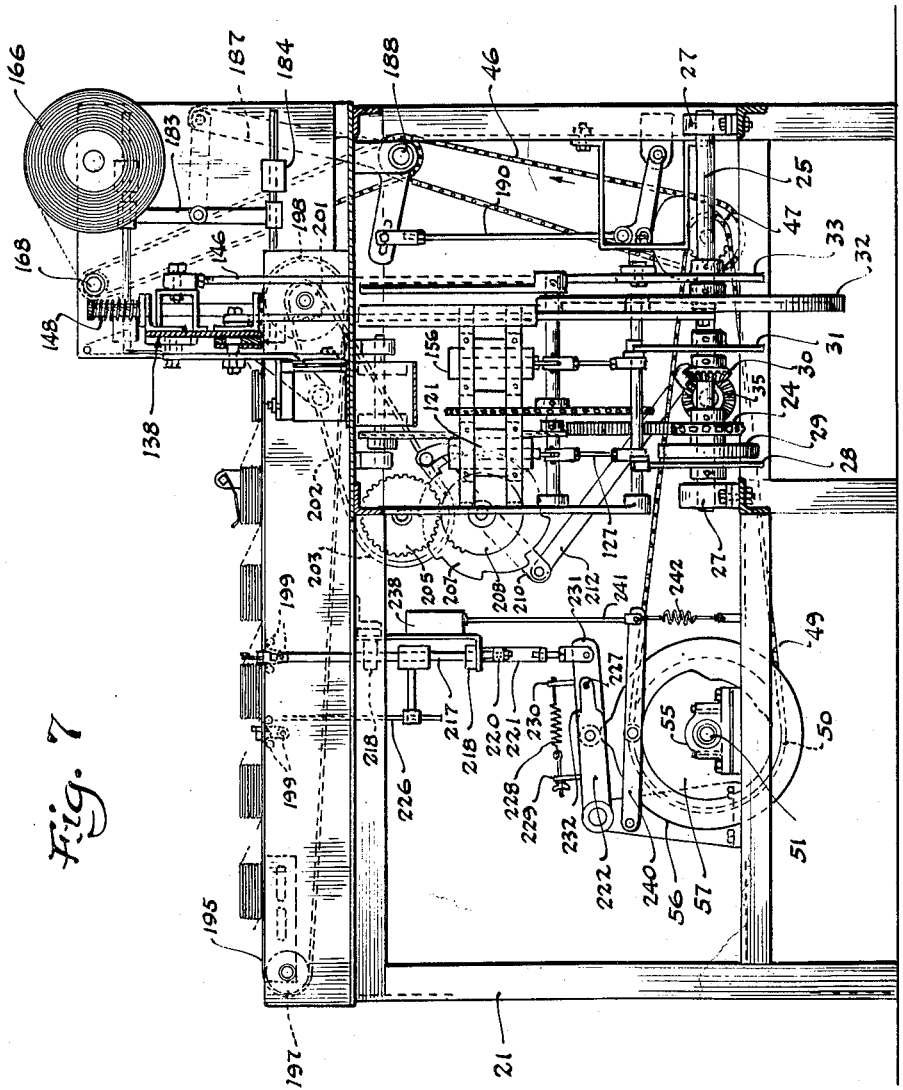

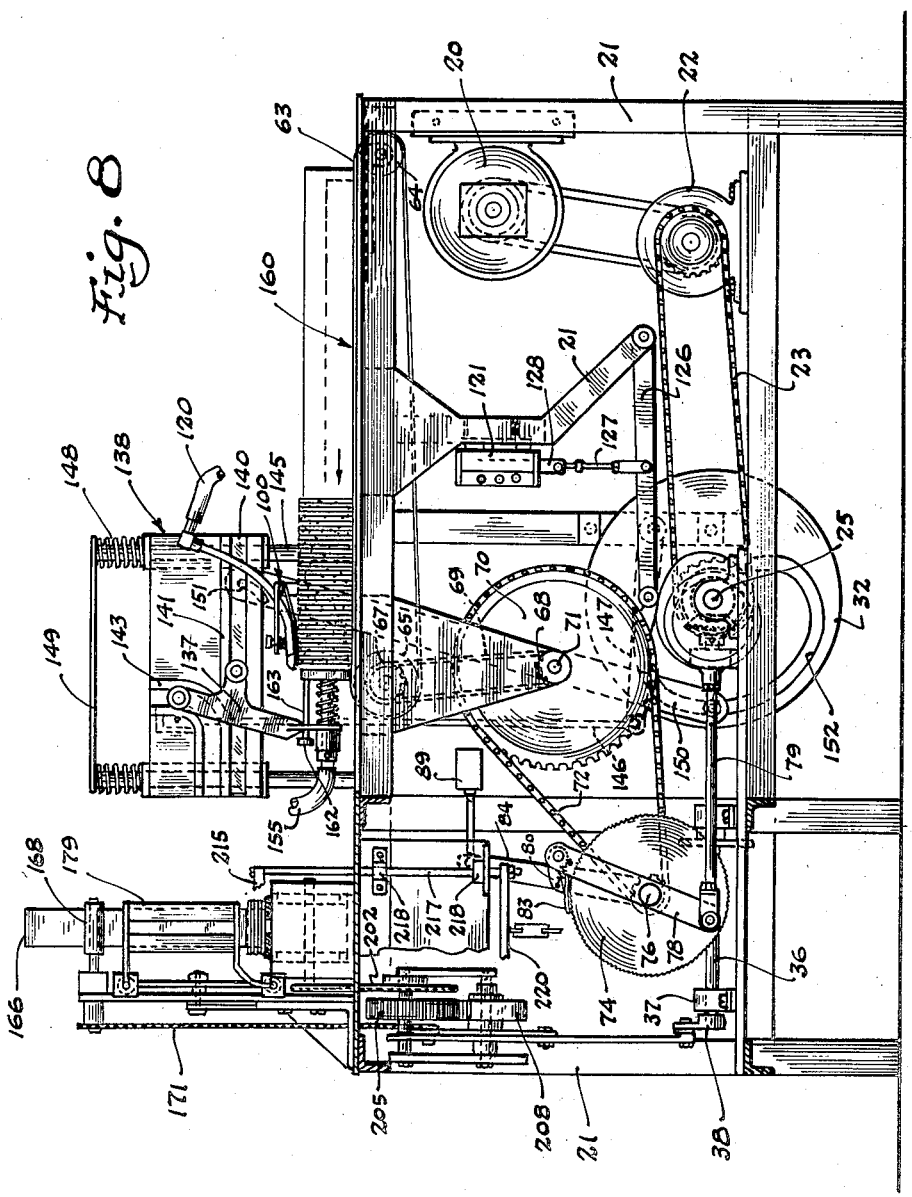

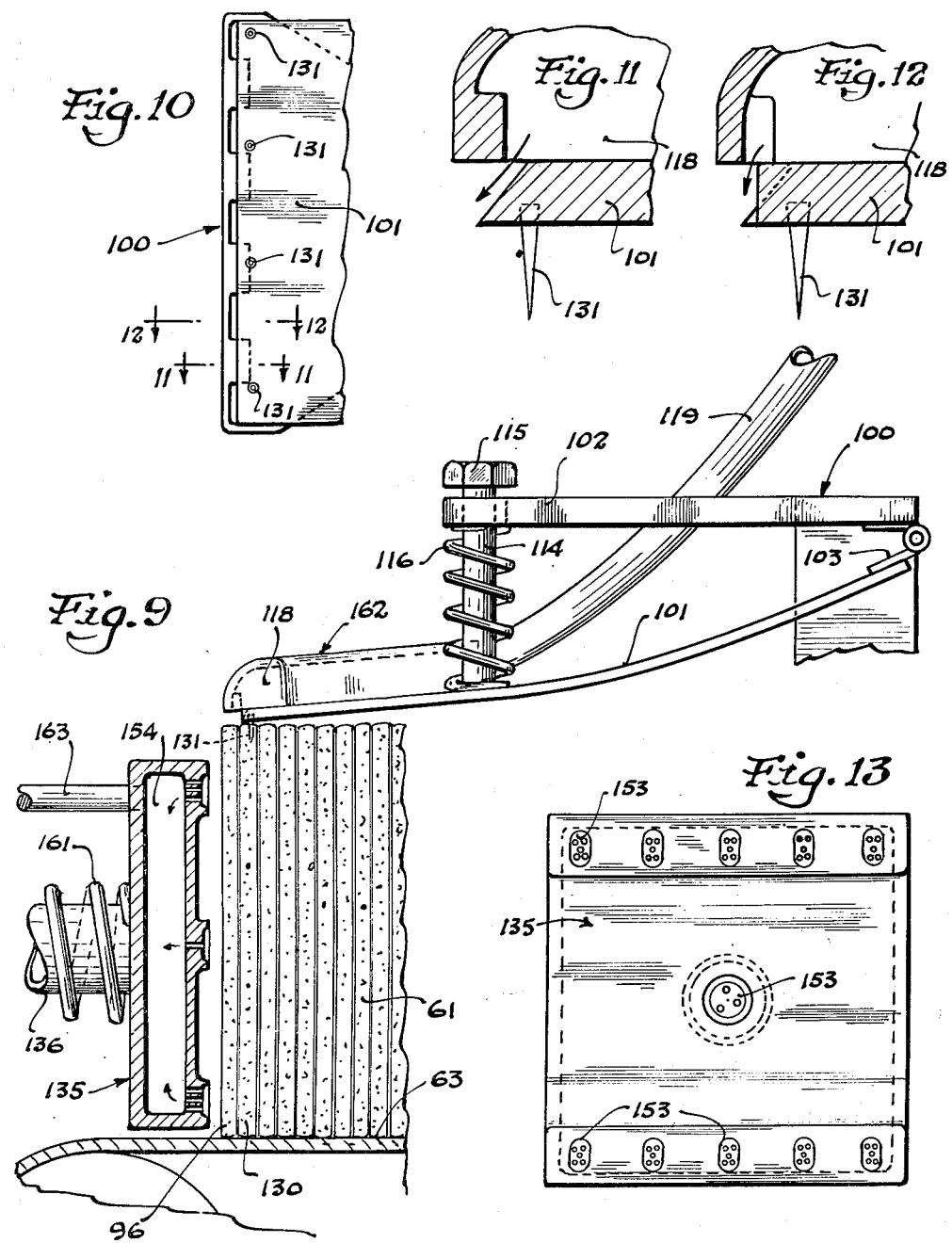

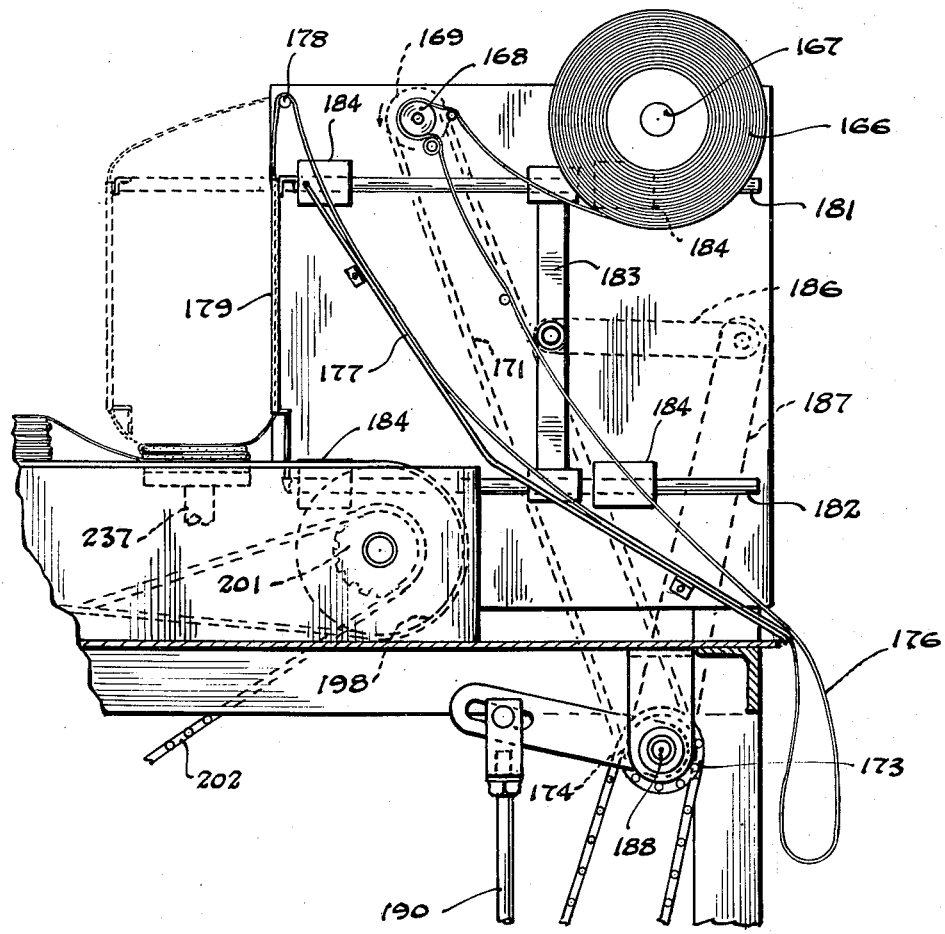
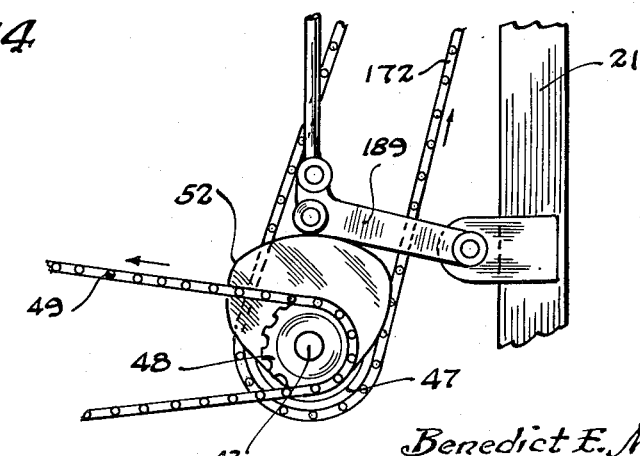
Fig. 14
INVENTORS
Benedict E. Meulemans
Warren A. Nelson
BY R. S. Story
ATTORNEY

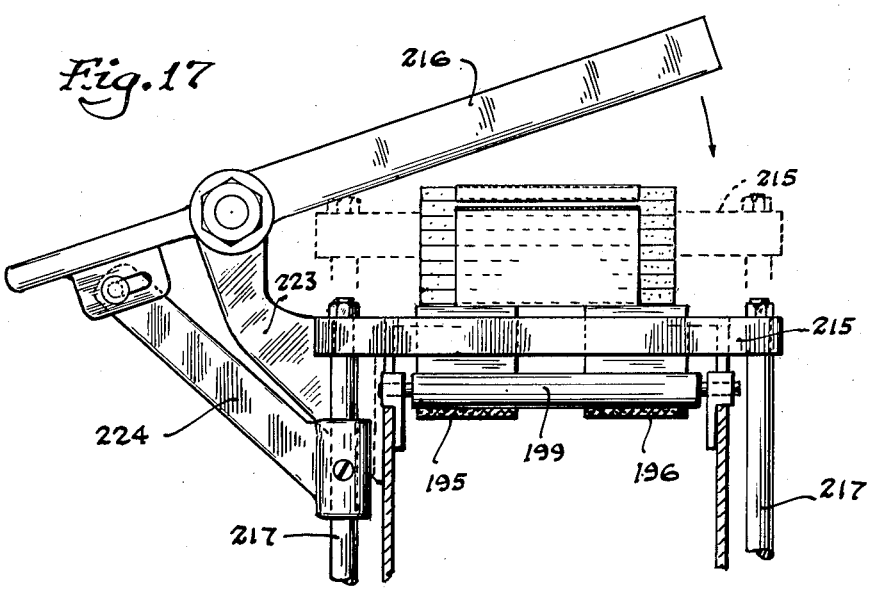
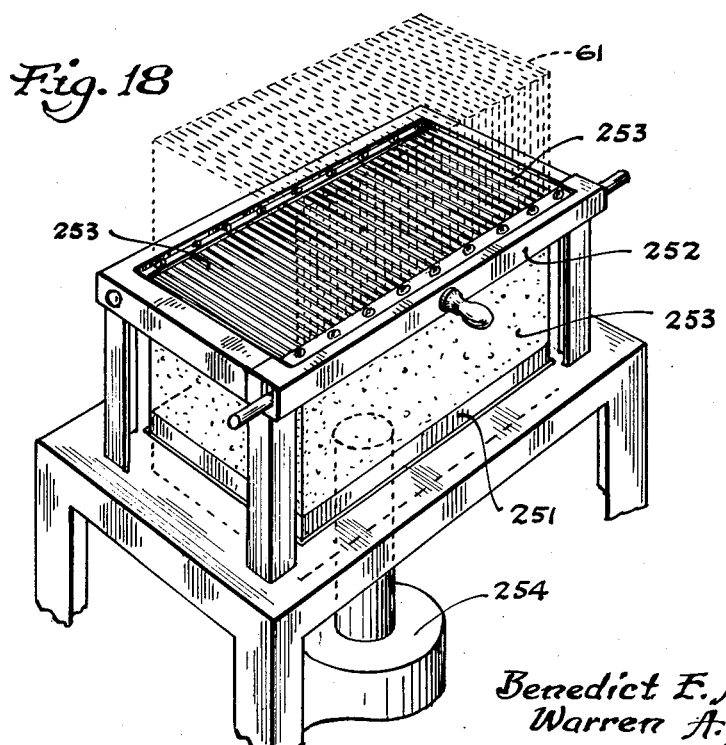

Patented Jan. 26, 1954

2,667,420

UNITED STATES PATENT OFFICE 2,667,420

METHOD AND APPARATUS FOR HANDLING SLICED FOOD

Benedict E. Meulemans and Warren A. Nelson, Green Bay, Wis., assignors to Swift & Company, Chicago, Ill., a corporation of Illinois Application August 8, 1950, Serial No. 178,268

26 Claims. (Cl. 99—171)

The present invention relates to a method and apparatus for use in the preparation of slabs of material for packaging.

In the preparation of many foods in which cheese is an ingredient, it is necessary or desirable that the cheese be in the form of slices. The cutting of such slices by hand is tedious and disadvantageous because of the difficulty in producing uniform slices. For this reason, there is a substantial demand for presliced cheese, preferably in the form of small packages containing a limited number of slices, which packages are of a type suitable for sale in self-service stores.

The problem that has been encountered in preparing such packages is the tendency of the slices to cohere. This occurs to such a great extent that when a number of slices are placed together in contact with each other for any period of time, one would hardly believe that they had ever been sliced. As a result, the user has great difficulty in attempting to separate the slices and many of the slices become broken in the process.

One effort that has been made to overcome this problem is directed to giving the slices a somewhat polished surface to reduce the cohesion between the slices. The present employment of that method is only in the field of processed cheese, and the possible applicability of that process in the field of natural cheese would appear to be open to question.

The principal object of the present invention is directed to a method and apparatus whereby a plurality of precut slices of cheese or the like may have a ribbon of a suitable material quickly and easily interwoven between the slices so as to reduce the cohesion and make them readily separable. A particular feature of this invention is in the method and apparatus for separating the individual slices from a precut block of slices and transporting them individually to the interleaver, where the ribbon is wound between the slices.

Additional objects and advantages include the ability to rapidly handle large quantities of cheese to produce individual groups of a given number of slices with a ribbon wound between each slice, which groups are in a condition for packaging; the separation of individual slices from a block of slices of a material such as cheese, which tends to adhere even though it has been recently sliced; the simplicity of operation, insuring that a single operator may load and care for a machine, turning out a substantial quantity of product; the safety of operation; the application of pressure to the interwoven stack as it is built up to drive out entrapped air; and the positive positioning of the slices as the interleaving is performed to produce a neat, regular stack.

Additional objects and advantages will become apparent from the following description taken in conjunction with the drawings, in which:

Fig. 3 is a plan view;

Fig. 4 is an elevation of the slab separator;

Fig. 5 is a plan view of a portion of the drive mechanism;

Fig. 6 is a perspective view partially schematic, of the drive mechanism for the discharge conveyor;

Fig. 7 is a section taken along line 7—7 of Fig. 3;

Fig. 8 is a section taken at line 8—8 of Fig. 3;

Fig. 9 is a side elevation of the separator and transfer heads (partially in section);

Fig. 10 is a view showing the underside of the separator head;

Fig. 11 is a section taken at line 11—11 of Fig. 10;

Fig. 12 is a section taken at line 12—12 of Fig. 10;

Fig. 13 is an end view of the transfer head;

Fig. 14 is a partial section taken at line 14—14 of Fig. 3 showing the interleaver mechanism;

Fig. 17 is a partial section taken at line 17—17 of Fig. 3; and

Fig. 18 is a diagrammatic illustration of the preferred method of preparing the slices for use in connection with the embodiment of the invention disclosed.

Power drive

In the embodiment which is herein illustrated and described, a number of integrated movements are obtained from a single power source. This not only provides economies in construction and maintenance, but also insures the positive inter-relationship between the various moving parts.

Figure 15:
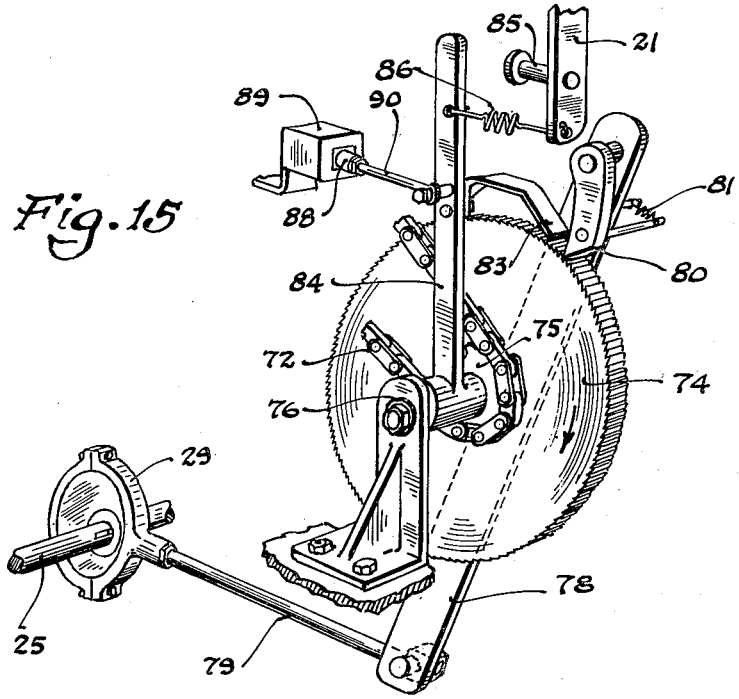
Fig. 15 is a perspective view of the intermittent power mechanism for the feed conveyor.

Referring particularly to Figs. 5, 7, and 8, an electric motor 20 mounted on the main frame 21 drives a speed reducer 22. The output of the speed reducer 22 is connected by a chain 23 to a sprocket 24 on shaft 25. Shaft 25 is journalled in bearings 27 attached to frame 21 and carries a plurality of cams to provide motions for the operation of various parts of the machine. From front to back in Figs. 5 and 7, the parts mounted on shaft 25 include: A separator head fluid control cam 28, an eccentric motion cam 29 to actuate the feed conveyor mechanism illustrated in Fig. 15, drive sprocket 24, bevel gear 30, transfer head fluid control cam 31, a box cam 32, an an external cam 33, the last two of which are used to provide the movements of the slab transfer head.

Bevel gear 30 on shaft 25 drives a second bevel gear 35 attached to a shaft 36. Shaft 36 is journalled in bearings 37 attached to frame 21. A crank 38 at the other end of shaft 36 from bevel gear 35 provides the power for the intermittent discharge conveyor mechanism illustrated specificaly in Fig. 6.

Chain 40 interconnects a sprocket 41 on shaft 36 and a sprocket 42 on shaft 43. Shaft 43 is journalled in bearings 44 on frame 21.

A chain 46 and a sprocket 47 on shaft 43 provide the drive for the ribbon of divider material. A sprocket 48 and a chain 49 drive a sprocket 50 attached to shaft 51. Cam 52 on shaft 43 provides the motion for the interleaver arms.

Shaft 51 is journalled in bearings 55 attached to frame 21. Two cams are mounted on shaft 51, one cam 56 actuates the ribbon cutoffs and the other cam 57 controls the vacuum valve to hold the ribbon in place as the slabs are deposited thereon.

Feed conveyor

The feed conveyor, generally 60, moves the block 61 to the separator, generally 62. The conveyor includes an endless belt 63 rotating about pulleys 64 and 65 suitably journalled in frame 21 (see Fig. 8). A sprocket 67 connected to belt pulley 65 is driven from a sprocket 68 by means of a chain 69. Sprocket 68 and sprocket 70 are attached to a shaft 71 which is journalled in frame 21. Sprocket 70 is driven from the intermittent step-by-step feed mechanism, particularly illustrated in Fig. 15 by means of chain 72.

The intermittent step-by-step feed mechanism includes a toothed wheel 74 to which is attached sprocket 75 driving chain 72. Toothed wheel 74 and sprocket 75 are rotatively mounted about a shaft 76.

A lever 78 is likewise pivotally mounted about shaft 76, and the lower end of lever 78 is attached to eccentric 29 by means of a connecting rod 79. The upper end of lever 78 carries a pivotally-mounted pawl 80 which is urged into engagement with toothed wheel 74 by means of a spring 81.

It will be apparent that as lever 78 pivots back and forth about shaft 76 by reason of its connection with eccentric 28, pawl 80 will be moved back and forth over the upper side of toothed wheel 74. As the pawl 80 moves to the right in Fig. 15, it will rotate toothed wheel 74 and sprocket 75 to drive the belt of feed conveyor 60. As the pawl moves to the left in Fig. 15, the spring 81 allows it to slip over the top of the teeth of wheel 74. The latter movement of arm 78 is sufficient so that during a substantial part of the movement the pawl 80 is riding up over an inclined platform 83.

Platform 83 is attached to an arm 84 pivotally mounted on shaft 76. Normally, arm 84 is held forwardly against a bumper 85 by reason of the action of spring 86, both of which are attached to frame 21. In this position, pawl 80 will traverse a predetermined number of teeth of wheel 74 during the course of the return movement of lever 78 and then slide up over platform 83 for an additional distance. As pawl 80 is rotated forwardly during the next stroke of lever 78, the pawl will slide down off the platform and engage a tooth in the wheel 74 which will be rotated an amount equal to that of the teeth traversed by the pawl.

However, if arm 84 should be moved away from stop 85 prior to the time pawl 80 starts the forward part of its stroke, an additional number of teeth will be uncovered by the movement of platform 83, and the pawl will more quickly engage a tooth in wheel 74 and will rotate toothed wheel 74 by such additional amount.

The armature 88 of a solenoid 89 is connected to arm 84 by means of rod 90. Normally, armature 88 is extended as arm 84 is pulled against bumper 85 by spring 86. By energizing solenoid 89, armature 88 is pulled in, extending spring 86 and moving platform 83 a given distance to uncover a predetermined number of additional teeth of wheel 74.

A photoelectric eye 92 cooperates with a light source 93 to look across the path of movement of the block of cheese 61 along conveyor 60 at a line 94 (Fig. 3). If this line is unobstructed, the electric eye will be affected by the light from source 93 to actuate a relay (not shown) and to connect solenoid 89 to a suitable electric power source.

The position of bumper 85 and the length of connecting rod 49 (Fig. 15) are adjusted so that normally pawl 80 will traverse a number of teeth such that each feeding movement of wheel 74 will move conveyor 60 a distance only slightly less than the thickness of one of the slices of cheese (which have been cut to a relatively uniform thickness).

Preferably, this amount is such that after four or five movements of conveyor 60, the end slab of cheese 96 (with reference to the direction of movement of conveyor 60) will not obstruct line 94 between light source 93 and photoelectric eye 92. Therefore, the photoelectric eye 92 will energize solenoid 89, moving platform 83 to uncover an additional number of teeth of wheel 74 as pawl 80 is moved forwardly into engagement with said teeth.

The length of arm 90 is adjusted such that the additional number of teeth uncovered by platform 83 is sufficient to cause toothed wheel 74 to move conveyor 60 sufficiently to restore the original position of the end of block 61 with respect to line 94, with the block obscuring the sight across line 94.

In the embodiment illustrated, wheel 74 has a total of 250 teeth, each tooth corresponding to a .005 movement of feed belt 63. With arm 84 against bumper 85, the normal movement of pawl 80 while it is in engagement with the teeth covers an angle equal to 26 teeth. When arm 84 is pulled away from the stop 85 by reason of its connection with armature 88 of solenoid 89, platform 83 uncovers 6 additional teeth so that as pawl 80 moves forward, it covers an angle equal to 32 teeth.

Slab separator

The separator includes a fluid jet head, generally 100, the details of which are best shown in Figs. 4, and 9 through 12. Head 100 is supported at one end of an arm 101 which is attached to a bracket 102 by means of a hinge 103. A pivot pin 105 is used to attach bracket 102 to an angle 106 forming a part of frame 21. An adjusting screw 107 is received in a threaded projection 108 attached to the backside of angle 106. The lower end of adjusting screw 107 is loosely attached to an arm 109 forming a part of bracket 102. A bolt 111 threaded into angle 106 passes through a slot 112 in arm 109. An adjusting screw 107 is raised or lowered, bracket 102 is pivoted about pin 105 to provide a slight movement of head 100 forward or backward with respect to line of sight 94 of the conveyor control mechanism.

A stud bolt 114 attached to arm 100 fits loosely through an opening in bracket 102. A nut 115 on the top of stud 114 prevents the stud from slipping all the way through the opening in bracket 102. A spring 116 between arm 100 and bracket 102 urges head 100 into contact with the upper side of block of cheese 61.

Head 100 is positioned so that the fluid jets are directed adjacent the plane of separation between the end slab of cheese 96 and the remainder of the block 61 (see Fig. 9). As shown in Figs. 10 through 12, two types of jets are used to completely detach the end slab from the block.

One jet, which may be referred to as a peeling jet, issues at an angle such that the blast has two components, one component parallel to the direction of movement of the block 61 on the conveyor, i. e., toward the end slab 96 from the remainder of the block 61, and the other component downwardly parallel to the plane between the end slab 96 and the remainder of the block 61. This jet, the structure of which is pictured in Fig. 11, strikes the upper surface of end slab 96 and starts detaching it from the remainder of the block.

To speed the removal of the bottom portion of the end slice 96, a second jet, referred to as a stripping jet, is used. The fluid from the stripping jet has primarily a downward component parallel to the plane between slab 96 and the remainder of the block 61. The fluid from the stripping jet drives into the pocket formed between the end slab 96 and block 61 as the peeling is commenced by the first jet and forces down along said plane to completely separate the end slab 96 from the block 61.

Both of these jets communicate with a chamber 118 within head 100, which chamber also communicates with the pipe 119. Pipe 119 is connected to a suitable source of air supply through a flexible tube 120, a valve 121, a surge drum 122, a pressure control valve 123, and pipe 124. The surge drum 122 prevents a dropping of the pressure to head 100 upon the opening of valve 121.

Referring to Figs. 5, 7, and 8, the air valve 121 is mounted on a portion of frame 21. The same portion of frame 21 also carries a pivotally-mounted arm 126, the outer end of which rides on cam 28. Intermediate of the two ends of the arm is a connecting rod 127 which controls the plunger 128 of valve 121 in response to the movements of arm 126. At the required instant during the operation of the machine, a low spot in cam 28 allows arm 126 to drop downwardly, opening valve 121 and applying air pressure to the fluid jets in head 100. Such air pressure is applied for a period only sufficiently long to strip the end slab from the block, at which time cam 28 again raises arm 126 to close valve 121.

In handling freshly-sliced slabs of cheese having a face dimension of approximately 4 inches by 4 inches, it has been found that from 55 to 70 pounds per square inch air pressure will perform an efficient job in stripping the end slab from the block. The exact amount is dependent upon various factors, one of the principal ones of which is the temperature of the cheese. Preferably, the temperature of the cheese should be between approximately 45° and 55° F.

In some embodiments there may be a tendency for the blast to also loosen the next-to-the-end slab 130 along with the end slab 96 (Fig. 9). This is particularly true if the position of jet head 100 is not properly adjusted with respect to the plane of separation between said two slabs. In such cases, a plurality of fingers 131 may be used to hold the next-to-the-end slab 130 from being loosened along with end slab 96.

In the embodiment illustrated, these fingers 131 take the form of small spikes projecting downwardly from head 100 just to the rear of the fluid jets. The surface area presented by the spikes 131 is sufficiently small so that as conveyor belt 63 moves block 61 the spikes will be forced through the cheese to permit the then end slice 96 to establish a position beyond the fingers. However, the fingers do offer sufficient resistance to hold the next-to-the-end slice 130 in place as the end slice 96 is extracted from the block.

*Transfer mechanism*

The transfer mechanism receives the slices after they have been detached from block 61 and places them on the discharge conveyor in proper position for the ribbon to be wound thereabout. The transfer mechanism includes a vacuum head, generally 135, which is substantially the same dimensions as a side of one of the slabs of cheese. Tube 136, projecting rearwardly from the face of head 135, is received in a sleeve in one end of arm 137, which arm is mounted on a carriage, generally 138.

One portion of arm 137 is pivotally attached to a slide 140 reciprocally mounted in ways 141 of carriage 138. A second portion of arm 137 has a roller 142 attached thereto, which roller is received in a cam guide 143 on carriage 138.

Carriage 138 is positioned on a pair of posts 145 which act as guides for the vertical movement of the carriage. A rod 146 connects the carriage to one end of an arm 147, the other end of which arm is pivotally attached to frame 21 (as is best seen in Fig. 8). A portion of arm 147 intermediate the ends thereof, rides on cam 33 on shaft 25. A pair of springs 148 about posts 145 between the upper portion of carriage 138 and a crosspiece 149 attached to posts 145 hold arm 147 in contact with cam 33.

A lever 150 is pivotally mounted about shaft 71 with the upper end of the lever attached to slide 140 on carriage 138 through a loose connection provided by slot 151 in arm 150 fitting over a stud bolt on slide 140 (Fig. 8). An extension on the bottom end of the lever 150 is received within slot 152 in box cam 32.

The structure of vacuum head 135 is best shown in Figs. 9 and 13. While the face of head 135 is substantially the same dimensions as the side of a slab of cheese, preferably a substantial portion of said face is undercut as illustrated in Fig. 9 to reduce the tendency of the cheese to adhere to the head. A plurality of suction cups 153 are formed in the nonundercut portions of said face with one vacuum cup 153 positioned approximately in the center of said face. The cups communicate with a chamber 154 within head 135, and tube 136 along with flexible hose 155 connects the chamber 154 to a valve 156.

Valve 156 is operated by cam 31 by the same type of arm and rod structure used in the operation of valve 121 from cam 28 (previously described). Valve 156 is adapted to connect the chamber 154 either to a suitable source of vacuum through pipe 158 or to a suitable source of air pressure through pipe 159, pressure-reducing valve 160, and pipe 124.

The mounting of tube 136 in the sleeve end of arm 137 permits the head to move back and forth toward and away from the arm. A spring 161 holds the head away from the arm, and a stop nut 162 on a guide 163 limits the movement of the head away from the arm. The guide 163 attached to head 135 is received within an opening in said end of arm 137, and serves to prevent any rotational movement of the head with respect to the arm.

Figure 1:
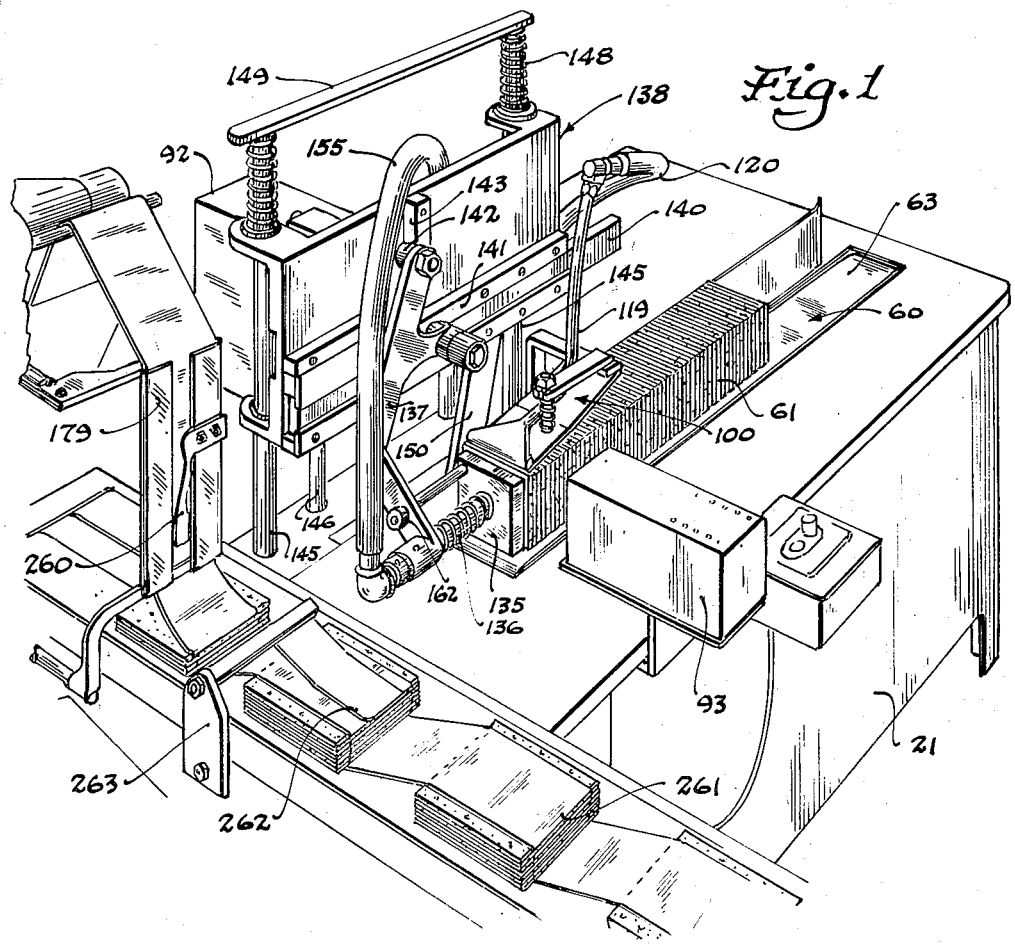
Fig. 1 is a perspective view of the upper portion of an embodiment of the invention with the transfer head in position to receive a slab of material.
Figure 2:
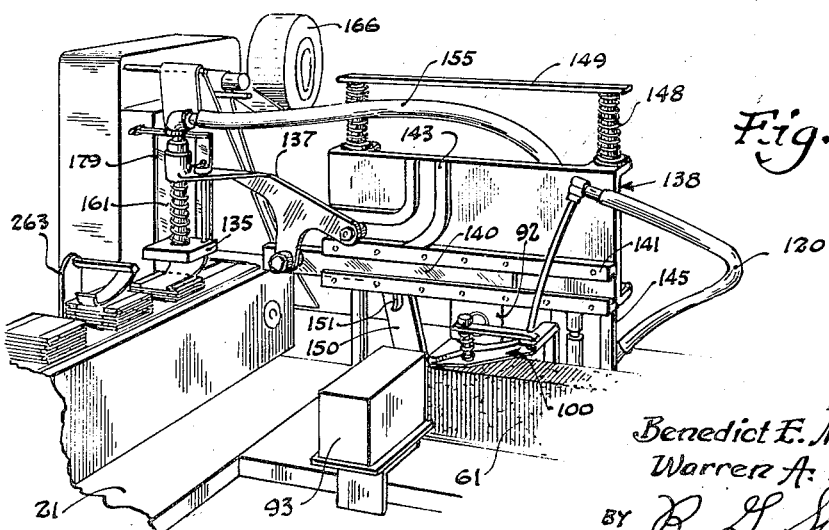
Fig. 2 is another view of the embodiment of Fig. 1 with the transfer head in position to deposit a slab of material.

The movement of the transfer head is best illustrated in Figs. 1 and 2. At the time that the air blast is produced from the jet head, the transfer head 135 is positioned parallel to the end of the block and about 1/8 of an inch away therefrom (see Fig. 9). As the end slab 96 is separated from the block, said slab moves over into contact with head 135. At this time valve 156 is set so that a vacuum is being applied to the cups 153 in the head and the detached slab of cheese is held to the head by said vacuum.

Thereupon, the upper end of lever 150 moves toward the interleaver (from right to left in Fig. 8), and slide 140 attached to the lever carries the arm and transfer head in said direction. The horizontal movement of slide 140 causes the head to be moved upward (as well as horizontally) with arm 137 pivoting about the connection with slide 140 due to the action of roller 142 in guide 143. As head 135 attains a position over the area on the discharge conveyor where the slab is to be deposited (the position illustrated in Fig. 2), a low spot on cam 33 allows arm 147 to descend under the force applied by springs 148.

If there is nothing to obstruct the movement of head 135, it would approach the upper surface of the discharge conveyor approximately the distance of the thickness of a slab of cheese. However, if a number of slabs have already been deposited over said area (as illustrated in Fig. 2), the downward movement of carriage 138 presses head 135 and the attached slab of cheese down onto the top of said stack, with spring 161 compressing to absorb the difference between the normal head movement and that permitted by the stack.

The pressure thus applied to the top of the stack tends to force any entrapped air out from between adjacent slabs in the stack, an important feature in the preservation of packaged cheese. It will be noted that increasing pressure is applied as the stack is built up, and by the time the stack is ready to be moved by the discharge conveyor, the elimination of the entrapped air should be complete.

Before head 135 is raised from the stack, valve 156 is actuated by cam 31 to disconnect chamber 154 from vacuum line 158 and to apply low-pressure air from pipe 159 to said chamber. The action of the air in cups 153, in addition to the undercutting of the face of the head, serves to quickly release the cheese from the head. Approximately two pounds of air pressure should be adequate.

Subsequently, cam 33 raises lever 147, pushing carriage 138 upward through the connection provided by rod 145. Lever 150 is pivoted clockwise (Fig. 8) about shaft 71 by cam 32, retracting slide 140 and returning head 135 to the position shown in Figs. 1 and 8.

Interleaver

The structure and operation of the interleaver is best seen in Fig. 14. A roll of divider material 166 is supported on a spindle 167 attached to frame 21. The ribbon passes over a power-driven feed roller 168. The feed roller is attached to a sprocket 169 connected to sprocket 47 by chains 171 and 172 and sprocket 173 and 174.

Feed roller 168 maintains a loop 176 of divider material which is supported on a guide 177. The other end of the loop passes over a pin 178 and down through the ribbon chute 179.

A pair of sliding bars 181 and 182, interconnected by a crosspiece 183, support ribbon chute 179, which is attached to one end of each of the bars. A plurality of bearings 184 attached to frame 21 holds rods 181 and 182 and allow the rods to be moved endwise in the bearings. A connecting rod 186 moves crosspiece 183, rods 181 and 182, and chute 179 in response to the pivotal movements of crank 187 about shaft 188. Crank 187, in turn, is actuated by the rotation of cam 52 about shaft 43 through pivoted lever 189 and rod 190.

The chute 179 is moved back and forth across the area of the conveyor upon which the slabs are deposited by transfer head 135. For example, starting in the full line position shown in Fig. 14, a slab of cheese is deposited in the area over the discharge conveyor. Thereupon, cam 52 rotates to move chute 179 to the dotted line position of Fig. 14. As this movement is made, the ribbon of divider material is drawn over pin 178 and down through the chute and laid across the top of the deposited slab. Subsequently, the transfer mechanism deposits another slab on top of the divider ribbon so laid. During this period, the dwell provided by cam 52 and the crank motion maintain the chute substantially in the dotted line position. The further rotation of shaft 43 again raises arm 189, rotating the crank 187 and returning chute 179 to the full line position of Fig. 14.

Discharge conveyor

The discharge conveyor includes a pair of endless belts 195 and 196 (Fig. 3) carried over end pulleys 197 and 198 and a plurality of small intermediate pulleys 199 (Fig. 7), the upper run of the belts acting to support and move the stacks. Pulleys 197 and 199 are all mounted from frame 21 for free rotation, while pulley 198 is power-driven. The power drive for pulley 198 is best seen in Figs. 5, 6, and 7.

A sprocket 201 is attached to pulley 198 and connected by a chain 202 to a sprocket 203 on the idler shaft 204. Idler shaft 204 also carries a gear 205. Mounted to one side of shaft 204 is a second shaft 206 to which is attached a toothed wheel 207 and a stripped gear 208. Gear 208 only has three teeth thereon, so that only one movement of gear 205 will be obtained for each full rotation of stripped gear 208.

A lever 210 is pivotally mounted on shaft 206 with a pawl 211 loosely affixed to the upper end of the lever. The lower end of the lever is connected to crank 38 on shaft 36 by means of the connecting rod 212. With each rotation of shaft 36, one oscillation of lever 210 is obtained with pawl 211 engaging toothed wheel 207 during the portion of the movement in one direction and sliding over the top of the toothed wheel in the portion of the movement in the opposite direction. An intermittent movement of gear 205 and, thus, conveyor belts 195 and 196 will be obtained after each given number of steps of movement of ratchet pawl 211, the number of steps being determined by the number of teeth in wheel 207.

In the illustrated embodiment, conveyor belts 195 and 196 will move one step after each eight successive movements of the transfer mechanism. The amount of movement of the conveyor belts is such as to space the stacks, each containing eight slices of cheese, along the conveyor belt as illustrated in Fig. 7.

After traversing the distance sufficient to accommodate several stacks of cheese (the exact distance depending on the length of movement of the conveyor each time the teeth on stripped gear 208 rotate gear 205), a pair of re-entrant portions of the conveyor belts 195 and 196 are produced by the two groups of three pulleys as formed by idlers 199 (see Fig. 7). The re-entrant portions are spaced so as to be on either side of a stack of cheese during the dwell of the conveyor. The two re-entrant portions each accommodate a paper cutter, one to cut the paper at the top edge of the stack, and the other to cut the paper at the bottom edge of the stack.

The first cutter, with reference to the line of movement of the discharge conveyor, must, because of its position in the illustrated embodiment, be adapted to cut the paper adjacent the top of the stack to produce a neat looking pile without any loose or torn edges. To achieve this, the bottom shear or anvil 215 is raised to a line adjacent the top of the stack during the cutting operation. At the same time the top shear 216 is pivoted down alongside the bottom shear to give the scissors action.

The bottom shear is supported by a pair of spaced posts 217, one mounted in guides 218 to either side of the conveyor (see Figs. 7, 8, and 17). A crosspiece 220 interconnects the bottom ends of posts 217, and an adjustable rod 221 supports crosspiece 220 from pivoted arm 222 riding on cam 56. Attached to frame 21 adjacent one of posts 217 is a bracket 223, which pivotally supports top shear 216. The portion of shear 216 extending beyond the pivotal connection to bracket 223 is connected to rod 217 through finger 224.

The second shear, with respect to the line of movement of the discharge conveyor, is similar to the first, except that the bottom shear blade 215 is fixedly attached to frame 21 with the upper edge of the shear blade 215 slightly below the level of movement of the stacks along the conveyor. The upper shear blade 216 is pivotally mounted on a bracket in the manner just described and is actuated by the raising of rod 226 attached at its lower end to one of rods 217 (Fig. 7).

After each intermittent movement of the conveyor, cam 56 raises lever 222 to move rods 217 and 226 upwardly, and as the rods move, the two shears close and neatly snip the paper to either side of the stack standing therebetween.

As a safety measure, a release mechanism is employed to stop the movement of the shears should they encounter any resistance substantially greater than that found when cutting the ribbon of divider material. This is achieved by having arm 222 constructed in two pieces pivotally connected by pin 227 (Fig. 7). A spring 228 between a pair of posts 229 and 230 on the two halves of arm 222 respectively normally maintains the outer end 231 of arm 222 rotated back against stop 232. The spring is sufficiently strong so that during normal operation the arm will be held in this locked position.

However, should an unusual resistance be encountered in the upward movement of rods 217 (which may be due to something blocking the pivotal movement of the top shears 216), the outer end 231 of arm 222 will pivot downward about pin 227, extending spring 228 as the cam 56 pushes the arm upwardly. As soon as the extra resistance is released or as cam 56 allows arm 222 to drop down, spring 228 will again rotate the outer end 231 of arm 222 against stop 232 and restore the original operating condition.

Figure 16:
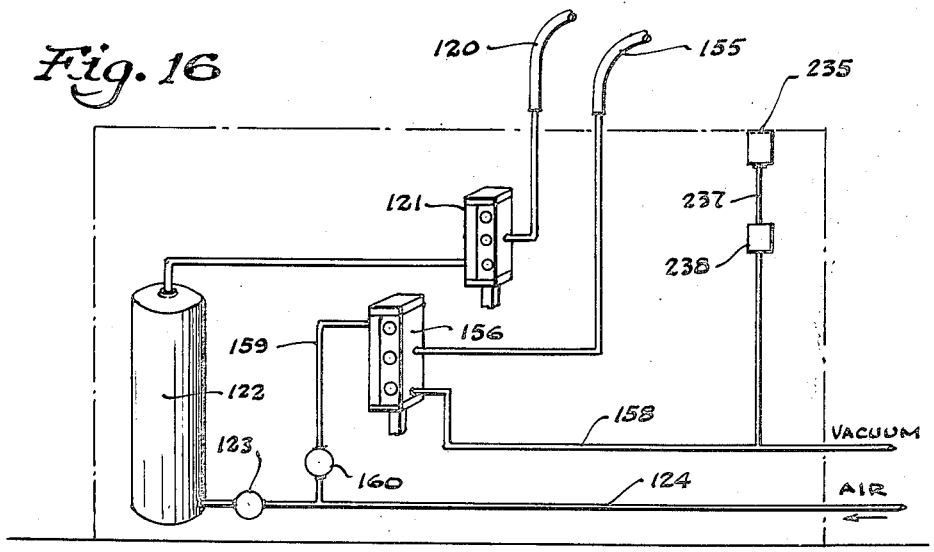
Fig. 16 is a schematic diagram of the fluid controls.

A ribbon hold-down is provided to prevent the stack from being displaced as it is being built up by the transfer mechanism. The two belts, plus an intermediate plate 235 of the same level as the top of the belts, form a table-like surface for receiving said slabs and for resisting the pressure applied by head 135 as it adds an additional slab to the top of a partially-formed stack. A plurality of holes 236 in plate 235 (Fig. 3) communicate with vacuum line 158 through a pipe 237 and valve 238 (Fig. 16).

Valve 238 is operated from cam 57 as illustrated in Fig. 7. Valve 238 is a slide valve with the plunger thereof being connected to an end of arm 240 by means of a rod 241. The other end of rod 240 is pivotally attached to frame 21, and an intermediate portion thereof rides on the cam 57. A spring 242 holds the arm 240 in contact with the cam.

During the period of time that a stack is building up, valve 238 is positioned so that a vacuum is applied to holes 236, which vacuum securely holds the ribbon of divider material in place over the table-like surface formed by plate 235 and belts 195 and 196. Just before the discharge conveyor makes one of its intermittent movements, cam 57 changes the position of valve 238 to break the vacuum and to release the ribbon of divider material. As the conveyor moves the stacks of slabs therealong, the ribbon of divider material is thrown out through chute 179 from loop 176. After the conveyor movement has been made, cam 57 actuates valve 238 to apply a vacuum to holes 236 and to again secure the ribbon of divider material in place while a new stack is being constructed.

*Operation*

It will be seen from the foregoing description that the operator, in turning out stacks of interleaved slices of cheese, merely has to see that feed conveyor 60 is kept loaded with slices of cheese. The stacks, completely interwoven with the edges of the ribbon neatly cut adjacent the edges of the stack, are discharged from a separate conveyor, ready to be placed in suitable packages for distribution.

The slabs may be prepared in a number of ways. Preferably, the slabs are prepared by forcing a block of cheese through a wire grid, commonly referred to as a "harp", as diagrammatically illustrated in Fig. 18. In such an apparatus, the unsliced block 250 is placed on a table-like surface 251, and a box-like frame 252 carrying a plurality of evenly-spaced wires 253 is forced through the block so that the wires cut the block into a plurality of slices. As illustrated in Fig. 18, the frame 252 is held in a stationary position, and table 251 is raised by means of a pneumatic cylinder 254 to force block 250 through the wires 253.

Such a method has an advantage in that the slices are extremely uniform in thickness and permit a stack of a given number of slices to be made up having a weight equal to a predetermined amount within very close tolerances. Further, it is a rapid method of producing the slices.

The sliced block is moved to conveyor belt 63 and deposited thereon with the rear side of the slices in contact with a guide 258. The belt 63 and guide 258 maintain an exact alignment of the slices as they are carried to the jet head 100 of the separator and detached from the block to be received by transfer head 135. Since the transfer head receives each slice in exactly the same position, the slices will each be deposited upon the discharge conveyor in exactly the same position, thereby producing a neat stack of slices with the edges of the slabs in perfect alignment.

Each step of the feed conveyor 60 brings a new slice up into position with the plane between the end slice and the next adjacent slice under the jets in head 100. As soon as the conveyor falls slightly behind in bringing the slices up to the original position the photoelectric cell is energized to actuate the extra feed solenoid, and a sufficient additional amount of movement is obtained from the conveyor to restore the original condition.

Should the jets in head 100 not be in exactly the right position for optimum operation, adjusting screw 107 may be moved to push head 100 either slightly forward of slightly back to position the jets in that position. Such movement will change the force with which head 100 bears against the side of the block of slabs 61, but this is of little importance as long as the head bears lightly against the side of the block.

It will be noted that the slices are separated from the block entirely by the fluid jet action in blowing down the plane of separation between the end slab and the next adjacent slab. This moves the slab over against transfer head 100, where it is secured to the head by reason of the vacuum applied to the cups thereon.

The transfer head then carries the detached slab over to the discharge conveyor and deposits it in a given position. In doing so, it applies pressure to the stack to expel any trapped air between the slices. The head subsequently releases the slab and goes back for another slab which has been brought into position by the feed conveyor 60 and is ready to be released by the separator.

While the next slab is being obtained, the interleaver draws a portion of the divider material from roll 166 and lays it across the top of the deposited slab. Chute 179 holds the divider material out of the way while the next slab is being deposited, and then moves across the stack to weave the divider material between the slabs.

After a given number of movements of the transfer head bringing slabs to the interleaver, the discharge conveyor is actuated to step the stacks of interleaved cheese in one position along the conveyor, the divider material having been released before the conveyor movement is started. At the end of the conveyor movement, the ribbon is in position for receiving the next slabs. It is locked in this position by the vacuum applied to the underside of the divider material.

While a new stack is building up, the shears are actuated to cut the ribbon to either side of a stack. Preferably, this takes place at least two steps along the discharge conveyor from the interleaving position in order that no problems be encountered in drawing the ribbon out through the chute 179 during the following movement of the discharge conveyor. In some embodiments, the second cutter may be eliminated but, in such cases, the appearance of the cut ends of the divider material will not be as attractive as if the ribbon were cropped closely to each side of the stack. It will be noted that the first cutter is spaced from the area in which the slabs are deposited for interleaving an amount greater than a given multiple of the distance of each movement of the discharge conveyor, but less than the next higher multiple of said distance so that the cutter will fall between two stacks and not clip into any stacks.

A tension adjustment is provided on chute 179 to bear against the paper travelling therethrough. The tension adjustment is by means of a spring arm 260 bolted to guide 179. By adjusting the tension with which the arm 260 bears against the paper, the operator may vary the force necessary to pull the paper out through the chute. If the tension is too little, the ribbon corners 261 where it passes over the end of the individual slabs, as illustrated in Fig. 1, tend to be baggy and have a poor appearance. By pulling the ribbon tightly about the corners of the slab, a neat appearance is given to the finished package. However, with an increased tension, the ribbon tends to tip the top slab of the following stack.

The spring finger 262 mounted from a bracket 263 attached to frame 21 at one side of the discharge conveyor smooths down the ribbon over the top of the stack which is immediately beyond the interleaver and prevents displacement of the top slab due to any excess tension applied by arm 260.

The foregoing description and drawings may suggest various modifications, which modifications are deemed to be within the scope of the invention as defined by the appended claims.

We claim:

1. A method of producing a bundle of slabs of food with portions of divider material between the slabs from a block composed of a plurality of said slabs, said method including moving the end slab away from the remainder of the block by blowing a blast of fluid along the line of juncture therebetween, depositing the separated slab on its side, and laying a portion of said divider material over the other side of said slab.

2. A method of producing a bundle of slabs of food with portions of divider material between the slabs from a block composed of a plurality of said slabs, said method including sequentially moving each end slab away from the remainder of the block by blowing a blast of fluid along the line of juncture between the end slab and the remainder of the block, sequentially grasping each separated slab at the other side of said slab, depositing said slab on said first-mentioned side over a given point, and laying a portion of said material over said other side of each slab after it is deposited.

3. A method of producing a bundle of slabs of food with a ribbon of divider material woven therethrough from a block composed of a plurality of said slabs, said method including sequentially separating each end slab from the block, sequentially depositing each separated slab over a point to build up a bundle of slabs, laying a portion of said divider material over each said deposited slab, intermittently moving the bundle of slices to one side after the deposit of a given number of slices, and severing the ribbon between two of said moved bundles.

4. A method of producing a bundle of slabs of food with portions of divider material between the slabs from a block composed of a plurality of said slabs, said method including sequentially blowing a blast of fluid down the plane between a side of each end slab and the remainder of the block to separate said end slab from the block, sequentially grasping each separated slab at the other side of said slab, depositing said slab on said first-mentioned side over a given point, pressing against the said other side of said deposited slab, releasing said other side, and laying a portion of said material over said other side of each slab after it is deposited.

5. A method for separating the end slab of a food material having a tendency to cohere from a block of said slabs, said method including the steps of intermittently blowing a blast of fluid along a plane generally parallel to the plane of juncture between the end slab and the remainder of the block, with a component thereof in a direction toward said end from the remainder of the block, and intermittently moving said block in timed relationship to said blowing and positioning said block so that said plane between the end slab and the remainder of the block substantially coincides with the plane of said blowing.

6. A device of the class described to produce a bundle of slabs with portions of divider material woven between the slabs from a block composed of a plurality of said slabs, said device including a feed mechanism to move said block of slices toward one end of said block, feed control means for said feed mechanism to position said end within a predetermined tolerance from a given plane, a slab separator to detach the slab at said end from said block and to move said slab in a direction transverse to said plane, said slab separator being positioned from said plane a distance equal to the thickness of said slabs, slab transfer mechanism positioned beyond said plane in said direction to receive said detached slab and to deposit it at a given point, and an interleaver to lay a portion of said material over said deposited slab.

7. A device of the class described to produce a bundle of slabs with portions of divider material between the slabs from a block composed of a plurality of said slabs, said device including a feed conveyor to move said block of slabs in a given direction toward one end of said block, feed control means for said feed conveyor to position said end within a predetermined tolerance from a given line transverse to the movement of said block, a fluid jet directed adjacent the plane between the slab at said end and the remainder of the block to separate said end slab from the block, slab transfer mechanism having a vacuum head to receive said detached slab and means to move said head between a first position parallel to and spaced from said line in said direction, at which position said head may pick up said slab after it is detached from said block by said separator, and a second position where said slab is deposited, and vacuum control means to apply a vacuum to said head while it is in said first position and while it is moving to said second position, and to release said vacuum when said head reaches said second position to deposit said slab, and an interleaver to lay a portion of said material over said slab after it is deposited by the release of said vacuum.

8. A device of the class described to produce a bundle of slabs with a ribbon of divider material woven therethrough from a block composed of a plurality of said slabs, said device including a feed conveyor to move said block toward one end of said block and to stop said block with said end adjacent a point, a slab separator to detach the slab at said end from said block, slab transfer mechanism to receive the detached slab, to move it along a given line to a second point and deposit it on its side over said second point, an interleaver to move a portion of said material over said deposited slab along a second line normal to said first line, a discharge conveyor actuated intermittently after a given number of movements of said transfer mechanism to move the accumulated pile of interwoven slabs from said second point, and means to sever the material between said stack and said interleaver.

9. A device of the class described to produce a bundle of slabs with portions of divider material between the slabs from a block composed of a plurality of said slabs, said device including feed conveyor to move said block of slabs toward one end of said block and to stop said block with said end adjacent a point, a slab separator to detach the slab at said end from said block, table means, slab transfer mechanism to receive the detached slab and to deposit it on its side over a second point on said table means, and an interleaver to lay a portion of said material across the top of the slabs deposited on said table means at said second point, said mechanism including a vacuum head having a face of substantially the same dimensions as a side of said slab, said face being positioned substantially parallel to said end when said head is in a first position and substantially parallel to said table means when said head is in a second position, said mechanism being constructed and arranged to move said head to within a distance of said table means, when said head is in a second position, substantially equal to the thickness of said slab, a resilient mounting for said head urging said head in the direction of said table when said head is in said second position whereby as several slabs are piled on said table means over said point, a pressure will be exerted between said table means and said head to tend to expel air entrapped between said slabs.

10. A device of the class described to produce a bundle of slabs with portions of divider material between the slabs from a block composed of a plurality of said slabs, said device including feed means to move said block of slabs toward one end of said block and to stop said block with said end adjacent a point, a slab separator to detach the slab at said end from said block, table means, slab transfer mechanism to receive the detached slab and to deposit it on its side over a second point on said table means, and an interleaver to lay a portion of said material across the top of the slabs deposited on said table means at said second point, said mechanism including a vacuum head having a face of substantially the same dimensions as a side of said slab, a positioning arm for said head, a resilient connection between said arm and said head urging said head in a direction away from said arm, and mounting means for said arm constructed and arranged to move said head laterally from said first point where said face is substantially parallel to said end and receives a slab detached from said block by said separator to said second point and to move said head vertically in said direction toward said table means at said second point with said face being substantially parallel to said table means, said vertical movement, if unobstructed, bringing said head within a distance of said table means approximately equal to the thickness of a slab whereby as a stack of slabs are built up over said second point, said resilient connection will permit said head to deposit additional slabs on said stack and apply pressure to the stack to expel air entrapped between said slabs.

11. A device of the class described to produce a bundle of slabs with portions of divider between the slabs from a block composed of a plurality of said slabs, said device including feed means to move said block of slabs toward one end of said block and to stop said block with said end adjacent a point, a slab separator to detach the slab at said end from said block, table means, slab transfer mechanism to receive the detached slab and to deposit it on its side over a second point on said table means, and an interleaver to lay a portion of said material across the top of the slabs deposited on said table means at said second point, said mechanism including a vacuum head having a face of substantially the same dimensions as a side of said slab, a positioning arm for said head, a resilient connection between said arm and said head urging said head in a direction away from said arm, and mounting means for said arm constructed and arranged to move said head laterally from said first point where said face is substantially parallel to said end and receives a slab detached from said block by said separtor to said second point and to move said head vertically in said direction toward said table means at said second point, with said face being substantially parallel to said table means, said vertical movement, if unobstructed, bringing said head to within a distance of said table means approximately equal to the thickness of a slab whereby as a stack of slabs are built up over said second point, said resilient connection will permit said head to deposit additional slabs on said stack and apply pressure to the stack to expel air entrapped between said slabs, and vacuum control means to apply a vacuum to said head while it is at said first point and while it is moving to said second point and to release said vacuum when said head reaches said second point.

12. A device of the class described to produce a bundle of slabs with a ribbon of divider material woven therethrough from a block composed of a plurality of said slabs, said device including feed means to move said block of slabs toward one end of said block and to stop said block with said end adjacent a point, a slab separator to detach the slab at said end from said block, table means, slab transfer mechanism to receive the detached slab and to deposit it on its side over a second point on said table means, and an interleaver to lay a portion of said material across the top of the slabs deposited on said table means at said second point, said mechanism including a vacuum head having a face of substantially the same dimensions as a side of said slab, a positioning arm for said head, a resilient connection between said arm and said head, and mounting means for said arm constructed and arranged to move said head laterally from said first point where said face is substantially parallel to said end and receives a slab detached from said block by said separator to said second point and to move said head vertically toward said table means at said second point with said face being substantially parallel to said table means, said vertical movement, if unobstructed, bringing said head within a distance of said table means approximately equal to the thickness of a slab whereby as a stack of slabs are built up over said second point, said resilient connection will permit said head to deposit additional slabs on said stack and apply pressure to the stack to expel air entrapped between said slabs, and fluid control means for said vacuum head to apply a vacuum to said head while it is at said first point and while it is moving to said second point and to release said vacuum when said head reaches said second point and to apply a fluid pressure to said vacuum head while it is at said second point to remove the slab from the head, said table means including a pair of spaced belts forming a discharge conveyor, and a platform between said spaced belts, said platform being perforated whereby a vacuum may be applied at the surface of the platform to hold the ribbon in place as the slabs are deposited at said second point, power means to intermittently move said belts to remove a stack from said second point, and vacuum control means to apply a vacuum at said perforations while said stack is being made and to release said vacuum as said stack is being removed.

13. A device for inserting portions of divider material between a plurality of slabs including table means, a transfer mechanism to sequentially receive said slabs and to deposit them on their sides at a given place on said table means, said transfer mechanism including a vacuum head having a vacuum cup on a face thereof, power means to move said head over said place and to press said slabs against said table to exclude any entrapped air in the stack of slabs, fluid control means to apply a vacuum to said cup to grasp and transfer each of said slabs and to apply a fluid pressure to said cup to release the slab from the head, and an interleaver to lay a portion of said material over each slab after it is deposited.

14. A device of the class described to produce a bundle of slabs with a ribbon of divider material woven therethrough from a block composed of a plurality of said slabs, said device including a bundle conveyor to intermittently move said bundles a given distance therealong, stacking means to sequentially deposit a plurality of said slabs on their sides at a given place on said conveyor, an interleaver to lay a portion of said ribbon over the other side of each of said slabs after it has been deposited, and a ribbon cutter positioned at a point along said conveyor in the direction of movement of said bundles along said conveyor, said cutter being spaced from said place an amount greater than said distance.

15. A device of the class described to produce a bundle of slabs with a ribbon of divider material woven therethrough from a block composed of a plurality of said slabs, said device including a bundle conveyor to intermittently move said bundles a given distance therealong, stacking means to sequentially deposit a plurality of said slabs on their sides at a given place on said conveyor, an interleaver to lay a portion of said ribbon over the other side of each of said slabs after it has been deposited, and a ribbon cutter positioned at a point along said conveyor in the direction of movement of said bundles along said conveyor, said cutter being spaced from said place an amount greater than a given multiple of said distance and less than the next higher multiple of said distance.

16. A device of the class described to produce a bundle of slabs with a ribbon of divider material woven therethrough from a block composed of a plurality of said slabs, said device including a bundle conveyor to intermittently move said bundles a given distance therealong, stacking means to sequentially deposit a plurality of said slabs on their sides at a given place on said conveyor, an interleaver to lay a portion of said ribbon over the other side of each of said slabs after it has been deposited, a ribbon cutter positioned at a point along said conveyor in the direction of movement of said bundles along said conveyor, said cutter being spaced from said place an amount greater than said distance, said conveyor including a pair of spaced belts each intersecting a portion of said place, a ribbon retainer platform positioned in the portion of said place between said belts, said platform being perforated, and means to apply a vacuum to said perforation in between said intermittent movements of the conveyor to retain the ribbon on said platform.

17. A device of the class described to produce a bundle of slabs with a ribbon of divider material woven therethrough from a block composed of a plurality of said slabs, said device including a bundle conveyor to intermittently move said bundles a given distance therealong, stacking means to sequentially deposit a plurality of said slabs on their sides at a given place on said conveyor, an interleaver to lay a portion of said ribbon over the other side of each of said slabs after it has been deposited, a ribbon cutter positioned at a point along said conveyor in the direction of movement of said bundles along said conveyor, said cutter being spaced from said place an amount greater than said distance, said conveyor including an endless belt, one run of said belt intersecting said place to receive the bundles, said run having a re-entrant portion forming a short gap in the conveying surface, said cutter having a pair of co-operating cutter blades, one of said blades normally being positioned within said re-entrant portion and the other normally thereabove, and means to bring said blades together after each movement of the bundles on the conveyor so as to sever the ribbon drawn therebetween.

18. A device of the class described to produce a bundle of slabs with a ribbon of divider material woven therethrough from a block composed of a plurality of said slabs, said device including a bundle conveyor to intermittently move said bundles a given distance therealong, stacking means to sequentially deposit a plurality of said slabs on their sides at a given place on said conveyor, an interleaver to lay a portion of said ribbon over the other side of each of said slabs after it has been deposited and to pull the ribbon tightly about the edges of the slab, a ribbon cutter positioned at a point along said conveyor in the direction of movement of said bundles along said conveyor, said cutter being spaced from said place an amount greater than said distance, said cutter including a cutter arm moveable toward the conveyor and ribbon moving therealong, power means to actuate said arm toward and away from said conveyor, and a yieldable connection between said power means and said arm to permit said arm to stop should the normal movement of the arm be obstructed.

19. In a device to separate a plurality of slabs having a tendency to cohere from a block of said slabs positioned with the planes between the slabs in a generally vertical direction, said device including a fluid jet directed only adjacent the plane between an end slab and the remainder of the block whereby said fluid will project along said plane stripping said slab from said block, and a conveyor to receive the detached slab and transport it from said block.

20. In a device to separate a plurality of slabs having a tendency to cohere from a block of said slabs, said device including a feed member for said block, a fluid jet member having fluid discharge openings substantially along a given line, one of said members being moveable with respect to the other of said members, power means for said moveable member, control means to position said moveable member so that said line is in an extension of the plane between the end slab and the remainder of said block and the jet is directed along said plane, whereby said fluid can project along said plane stripping said slab from said block, and a conveyor to receive the detached slab and transport it from said block.

21. In a device to separate a plurality of slabs having a tendency to cohere from a block of said slabs positioned with the planes between the slabs in a generally vertical direction, said device including a feed member for said block, a fluid jet member having fluid discharge openings substantially along a given line, one of said members being moveable with respect to the other of said members, power means for said moveable member, control means to position said moveable member so that said jet is directed only adjacent the plane between the end slab and the remainder of said block, said discharge openings giving the discharged fluid two components, said jet being so positioned with respect to said block that one of said components is substantially parallel to the planes between adjacent slabs and the other of said components being in the direction of said end, and a conveyor to receive the detached slab and transport it from said block.

22. In a device to separate a plurality of slabs having a tendency to cohere from a block of said slabs positioned with the planes between the slabs in a generally vertical direction, said device including a feed conveyor for said block, power means to move said block along said conveyor in a given direction, a fluid jet having fluid discharge openings substantially along a given line with the discharge openings giving the discharged fluid two components, said jet being mounted to be on a side of said block as it moves along said conveyor, said jet having a component in said direction, control means for said power means to position said block on said conveyor with said line in the plane between the end slab in said direction and the remainder of the block with one of said components being directed along said plane and the other of said components overlapping onto said slab, valve means to intermittently release a fluid blast through said jet to separate said slab from said block, and a conveyor to receive the detached slab and to transport it from said block.

23. In a device to separate a plurality of slabs having a tendency to cohere from a block of said slabs positioned with the planes between the slabs in a generally vertical direction, said device including a feed conveyor for said block, power means to move said block along said conveyor in a given direction, a fluid jet having fluid discharge openings substantially along a given line with the discharge openings giving the discharged fluid two components, said jet being mounted to be on a side of said block as it moves along said conveyor, said jet having a component in said direction, control means for said power means to position said block on said conveyor with said line in the plane between the end slab in said direction and the next adjacent slab with one of said components being directed along said plane and the other of said components overlapping onto said end slab, valve means to intermittently release a fluid blast through said jet to separate said end slab from said block, a plurality of fingers to yieldably grasp said next adjacent slab to prevent it from being detached with said end slab, and a conveyor to receive the detached slab and to transport it from said block.

24. In a device to separate a plurality of slabs having a tendency to cohere from a block of said slabs, said device including a feed conveyor for said block to move said block along a given path, power means to intermittently move said block along said conveyor in a given direction, a fluid jet head having fluid discharge openings substantially along a given line, a mounting for said head, including an arm, one end of which is attached to said head, said mounting resiliently urging said head against a side of said block, said mounting including means constructed and arranged to permit said head to be moved generally parallel to said path, said openings being so positioned that the fluid therefrom will have two components, a first component directed adjacent to said point and substantially parallel to the plane between the end slab and the next adjacent slab, and the other component being in said given direction, said head having projecting points to engage said block to the rear of said line with respect to the said direction of movement of the block, control means for said power means to position the block with said plane substantially intersecting said point, with said end slab projecting beyond said point in said direction, valve means to intermittently release a fluid blast through said openings to separate said slab from said block, and a conveyor to receive the detached slab and transport it from said block.

25. In a device to separate a plurality of slabs having a tendency to cohere from a block of said slabs, said device including a conveyor for said block, a power-driven, intermittent step feed for said block on said conveyor, the amount of each movement of said intermittent feed being less than the thickness of said slabs, a slab stripper mounted adjacent a given point along the path of movement of the block on said conveyor, control means for said feed including a photoelectric means positioned to look across said conveyor along a line a distance from said point substantially equal to the thickness of a slab, said line being beyond said point with reference to the direction of movement of said conveyor, said control means being constructed and arranged to increase the number of steps of said intermittent feed at such times as said line is not blocked by the end slab, and a conveyor to receive the detached slab and transport it from said block.

26. A stripper for separating the end slab of a material having a tendency to cohere from a block of said slabs, said stripper including a fluid jet head, means for mounting said head with a portion thereof substantially in contact with a side of said block, said head having a single line of fluid discharge openings along the portion thereof next to said side, said line being adjacent the line of juncture between said end slab and the remainder of said block, said openings being so positioned that the fluid therefrom will have two components, a first component substantially parallel the plane between the end slab and the next adjacent slab, and the other component being toward said end slab from the remainder of said block.

BENEDICT E. MEULEMANS.
WARREN A. NELSON.

References Cited in the file of this patent

UNITED STATES PATENTS

| Number | Name | Date |
| --- | --- | --- |
| 296,067 | Romer et al. | Apr. 1, 1884 |
| 554,020 | Dehaitre | Feb. 4, 1896 |
| 1,418,145 | Fischer | May 30, 1922 |
| 1,488,673 | Henderson | Apr. 1, 1924 |
| 1,498,965 | Henderson | June 24, 1924 |
| 1,553,738 | Arey | Sept. 15, 1925 |
| 1,606,016 | Christophel | Nov. 9, 1926 |
| 1,867,038 | Upham | July 12, 1932 |
| 2,497,330 | Smith | Feb. 14, 1950 |